(12) United States Patent
Fujii (10) Patent No.: US 10,774,848 B2
(45) Date of Patent: Sep. 15, 2020

(54) NEUTRAL VALVE AND VALVE ASSEMBLY INCLUDING SAME

(71) Applicant: KAWASAKI JUKOGYO KABUSHIKI KAISHA, Kobe-shi, Hyogo (JP)

(72) Inventor: Tomoyuki Fujii, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 16/328,679

(22) PCT Filed: Aug. 24, 2017

(86) PCT No.: PCT/JP2017/030424
§ 371 (c)(1),
(2) Date: Feb. 26, 2019

(87) PCT Pub. No.: WO2018/038231
PCT Pub. Date: Mar. 1, 2018

(65) Prior Publication Data
US 2019/0186505 A1 Jun. 20, 2019

(30) Foreign Application Priority Data
Aug. 26, 2016 (JP) .................................. 2016-166059

(51) Int. Cl.
*F16K 11/07* (2006.01)
*F15B 11/00* (2006.01)
(Continued)

(52) U.S. Cl.
CPC .............. *F15B 11/00* (2013.01); *F16K 11/07* (2013.01); *F16K 11/0716* (2013.01); *F16H 61/4069* (2013.01); *F16H 61/439* (2013.01)

(58) Field of Classification Search
CPC ...... F15B 11/00; F16K 11/07; F16K 11/0716; F16H 61/4069; F16H 61/439
(Continued)

(56) References Cited

U.S. PATENT DOCUMENTS 868,680 A * 10/1907 Martin .................. B01F 5/0403
137/111
3,213,886 A * 10/1965 Pearne .................... F15B 11/00
137/625.69
(Continued)

FOREIGN PATENT DOCUMENTS

JP    2653842 B2    9/1997

*Primary Examiner* — Minh Q Le
(74) *Attorney, Agent, or Firm* — Oliff PLC (57) ABSTRACT

A neutral valve includes a spool inserted in a housing so as to be movable in a predetermined direction, the spool configured to move to a neutral position set such that a first and second port are connected to each other through a valve passage, a first offset position located at neutral position's first side in the predetermined direction and set such that second port and valve passage are disconnected from each other, and a second offset position located at neutral position's second side in the predetermined direction and set such that first port and valve passage are disconnected from each other. The spool's outer peripheral portion includes a first pressure receiving surface receiving first port's fluid pressure to be pushed toward the first side in the predetermined direction and a second pressure receiving surface receiving second port's fluid pressure to be pushed toward second side in the predetermined direction.

8 Claims, 5 Drawing Sheets (51) Int. Cl.
*F16H 61/4069* (2010.01)
*F16H 61/439* (2010.01)

(58) Field of Classification Search
USPC .............................. 137/625.68, 111, 112, 113
See application file for complete search history.

(56) References Cited

U.S. PATENT DOCUMENTS

| | | | | |
|---|---|---|---|---|
| 3,215,160 | A * | 11/1965 | Rice | F15B 13/04 |
| | | | | 137/596.2 |
| 3,386,471 | A * | 6/1968 | King | F15B 13/01 |
| | | | | 137/596.2 |
| 5,184,643 | A * | 2/1993 | Raymond | F16K 11/07 |
| | | | | 137/625.48 |
| 5,325,891 | A * | 7/1994 | Mateja | F16K 11/0716 |
| | | | | 137/625.48 |
| 5,992,294 | A * | 11/1999 | Seddon | F15B 13/0402 |
| | | | | 192/103 F |
| 8,171,951 | B2 * | 5/2012 | Quendt | F16K 11/044 |
| | | | | 137/111 |
| 2010/0154896 | A1 * | 6/2010 | Thrash, Jr. | F16K 11/044 |
| | | | | 137/112 |
| 2012/0247594 | A1 * | 10/2012 | Inagaki | F15B 5/006 |
| | | | | 137/625.69 |
| 2015/0128826 | A1 * | 5/2015 | Sachan | B60T 13/665 |
| | | | | 105/463.1 |
| 2017/0254431 | A1 * | 9/2017 | Kopp | F16K 31/04 |
| 2018/0058040 | A1 * | 3/2018 | Kondo | F15B 13/0401 |

* cited by examiner

NEUTRAL VALVE AND VALVE ASSEMBLY INCLUDING SAME

TECHNICAL FIELD

The present invention relates to a neutral valve for use in a hydraulic closed circuit, and a valve assembly including the neutral valve.

BACKGROUND ART

In a HST (Hydro Static Transmission) that is one type of hydraulic continuously variable transmission, a hydraulic pump and a hydraulic motor are connected to each other by a closed circuit. In the HST, a rotational frequency (rotational speed) of the hydraulic motor can be controlled by adjusting an discharge flow rate of the hydraulic pump. The hydraulic motor can be stopped by setting the discharge flow rate of the hydraulic pump to zero. Further, the hydraulic pump can switch an discharge direction of operating oil. A rotational direction of the hydraulic motor can be switched by switching the discharge direction. One example of such hydraulic pump is a variable-displacement, both-tilt (over-center) swash plate pump.

According to this swash plate pump, in order to set the discharge flow rate to zero, a tilting angle of a swash plate needs to be kept at 0°. However, it is structurally difficult to continuously keep the tilting angle of the swash plate at 0°. Therefore, the operating oil is ejected from one of two ports of the swash plate pump at all times. As a result, differential pressure is generated between two ports of the hydraulic motor, and the hydraulic motor is continuously driven. To avoid this, the HST includes a neutral control valve disclosed in, for example, PTL 1.

A neutral valve of PTL 1 includes two pressure chambers connected to two respective ports of the swash plate pump, and pressures of the two pressure chambers act on both respective end portions of a spool against each other. When differential pressure between the two pressure chambers is low, the spool is located at a neutral position to make the two ports communicate with each other. With this, the differential pressure which may be generated between the two ports of the hydraulic motor is absorbed, and thus, the driving of the hydraulic motor can be stopped. On the other hand, when the differential pressure between the two pressure chambers is high, the spool moves to disconnect the two ports from each other. With this, energy efficiency deterioration caused when the hydraulic motor is driven with the two ports communicating with each other.

CITATION LIST

Patent Literature

PTL 1: Japanese Patent No. 2653842

SUMMARY OF INVENTION

Technical Problem

The neutral control valve of PTL 1 includes two springs. The two springs bias the spool so as to act against the pressures applied from the pressure oil of the two pressure chambers. To be specific, the spool moves to a position where hydraulic pressures of the two pressure chambers and biasing forces of the two springs are balanced. Therefore, the biasing force of the spring needs to be such force that can act against a load received by the spool from the pressure oil of the pressure chamber. According to the neutral control valve of PTL 1, both entire axial end portions of the spool receive the respective hydraulic pressures of the pressure chambers. Therefore, the load received by the spool is extremely high. On this account, the springs need to be increased in size, and the neutral control valve is inevitably increased in size.

An object of the present invention is to provide a neutral valve capable of preventing an increase in size.

Solution to Problem

A neutral valve of the present invention includes: a housing including a first port and a second port; a spool inserted in the housing so as to be movable in a predetermined direction, the spool being configured to move to a neutral position set such that the first port and the second port are connected to each other through a valve passage, a first offset position located at a first side of the neutral position in the predetermined direction and set such that the second port and the valve passage are disconnected from each other, and a second offset position located at a second side of the neutral position in the predetermined direction and set such that the first port and the valve passage are disconnected from each other; and first and second biasing members configured to bias the spool toward the first side and the second side in the predetermined direction, respectively, against each other to locate the spool at the neutral position, wherein: an outer peripheral portion of the spool includes a first pressure receiving surface configured to receive fluid pressure of the first port to be pushed toward the first side in the predetermined direction and a second pressure receiving surface configured to receive the fluid pressure of the second port to be pushed toward the second side in the predetermined direction; the housing includes a first pressure chamber and a second pressure chamber which are isolated from the first port and the second port, both predetermined-direction end portions of the spool being arranged at the respective first and second pressure chambers; and the first pressure chamber and the second pressure chamber are connected to the valve passage through a communication passage.

According to the present invention, the first pressure receiving surface and the second pressure receiving surface are formed on an outer peripheral surface of the spool. With this, the spool can move from the neutral position to the first offset position and the second offset position, and the neutral valve can achieve its function. Further, the first pressure chamber and the second pressure chamber are connected to the valve passage through the communication passage. Therefore, the fluid pressures received by both predetermined-direction end portions of the spool can cancel out each other. With this, the spool can be operated by smaller force than a neutral control portion of prior art, and therefore, the neutral valve can be prevented from increasing in size.

In the above invention, the neutral valve may be configured such that: the spool includes a convex portion formed at an intermediate portion of an outer peripheral surface of the spool over an entire periphery in a circumferential direction; the first pressure receiving surface faces the second side of the convex portion in the predetermined direction; and the second pressure receiving surface faces the first side of the convex portion in the predetermined direction.

According to the above configuration, pressure receiving areas of the two pressure receiving surfaces can be adjusted by a projection amount of the convex portion. For example, by suppressing the projection amount, the pressure receiving areas can be made small, and therefore, a load acting on the spool can be suppressed.

In the above invention, the housing may include a third port connected to at least one of the first pressure chamber and the second pressure chamber.

According to the above configuration, when a difference between liquid pressures of the two ports increases, the port having the lower liquid pressure and the valve passage are disconnected from each other. Therefore, the fluid of the port having the higher liquid pressure is introduced to the first pressure chamber and the second pressure chamber through the valve passage. To be specific, the high-pressure fluid selected from the fluids of the two ports is introduced to the first pressure chamber and the second pressure chamber, and the fluid can be output through the third port. With this, the neutral valve having a higher pressure selecting function can be realized.

A valve assembly of the present invention includes: the above-described neutral valve; and a discharge valve capable of discharging a fluid flowing through a fluid passage and configured to adjust a discharge amount of the fluid based on output pressure output from the third port, wherein the discharge valve is assembled to the housing of the neutral valve.

According to the above configuration, the discharge valve is assembled to the housing of the neutral valve. With this, a passage connecting the two valves to each other can be omitted or shortened. Thus, the valve assembly can be made compact.

In the above invention, the discharge valve may include: a valve element configured to receive the output pressure and change the discharge amount of the fluid in accordance with the output pressure; and a discharge-side biasing member configured to bias the valve element against the output pressure.

According to the above configuration, the discharge valve capable of changing the discharge amount in accordance with the output pressure can be assembled to the neutral valve.

The above object, other objects, features, and advantages of the present invention will be made clear by the following detailed explanation of preferred embodiments with reference to the attached drawings.

Advantageous Effects of Invention

According to the present invention, the neutral valve can be prevented from increasing in size.

DESCRIPTION OF EMBODIMENTS

Hereinafter, a valve assembly 1 according to an embodiment of the present invention will be explained with reference to the drawings. It should be noted that directions stated in the following explanations are used for convenience sake, and directions and the like of components of the present invention are not limited. Further, the valve assembly 1 explained below is just one embodiment of the present invention. Therefore, the present invention is not limited to the embodiment, and additions, deletions, and modifications may be made within the scope of the present invention.

Hydraulic Continuously Variable Transmission

Figure 1:
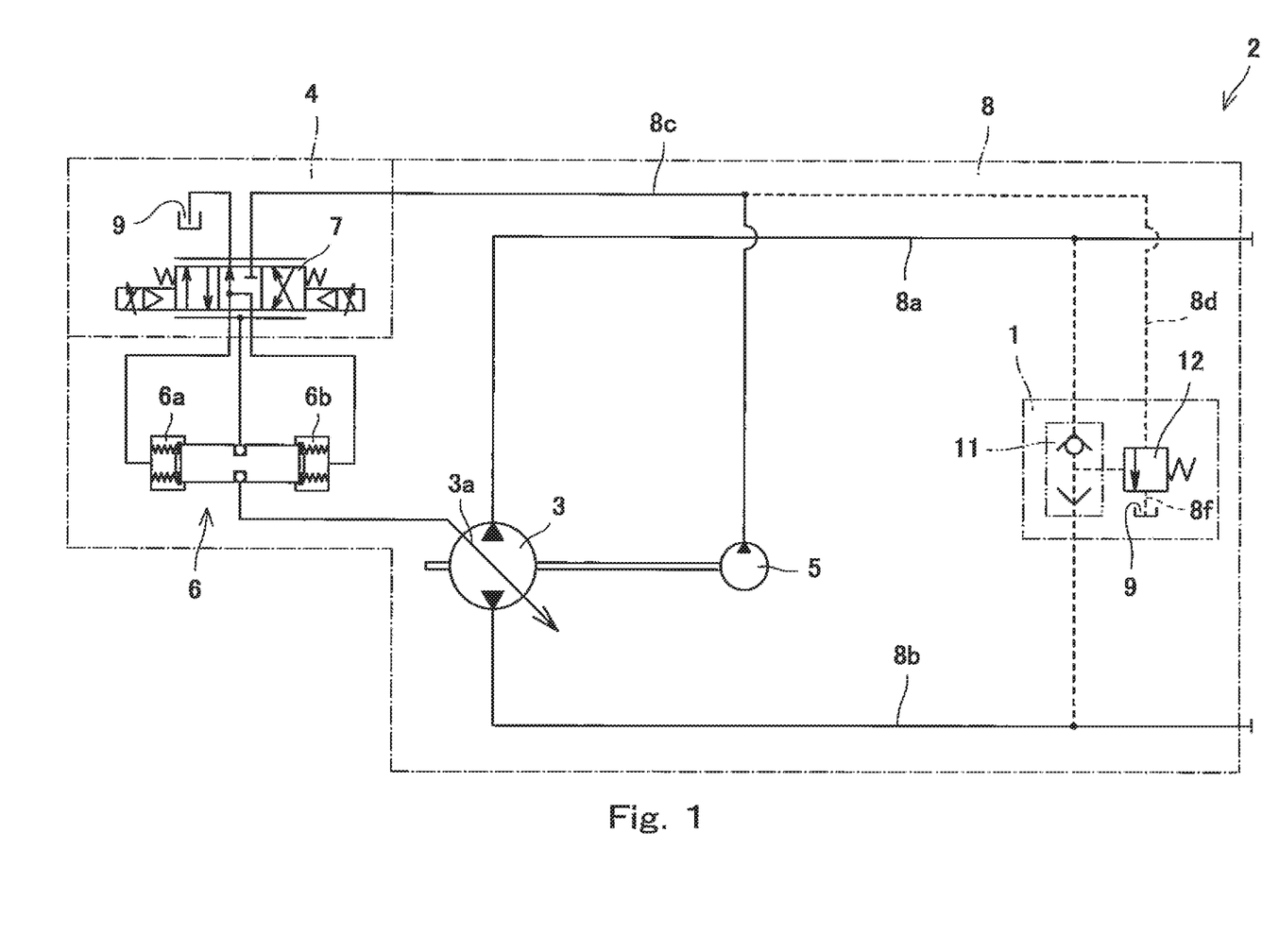
FIG. 1 is a hydraulic circuit diagram schematically showing a hydraulic driving system including a valve assembly according to an embodiment of the present invention.

The valve assembly 1 is configured by assembling a neutral valve 11 and a cutoff valve 12 and is included in a hydraulic continuously variable transmission (i.e., HST) 2 shown in FIG. 1. The HST 2 is one example of a hydraulic closed circuit and includes a hydraulic motor (not shown). The HST 2 switches a flow direction of operating oil to rotate the hydraulic motor normally or reversely. Further, the HST 2 changes the flow rate of the operating oil, supplied to the hydraulic motor, to steplessly change the speed of the hydraulic motor.

More specifically, the HST 2 further includes a hydraulic pump 3, a regulator 4, and a pilot pump 5. The hydraulic pump 3 is connected to a first oil passage 8a and a second oil passage 8b which are fluid passages. The hydraulic pump 3 is rotated by a driving device (not shown; an engine, an electric motor, or the like). When the hydraulic pump 3 is driven, the hydraulic pump 3 suctions the operating oil from one of the first oil passage 8a and the second oil passage 8b and ejects the operating oil to the other. The hydraulic pump 3 having such function is a so-called variable-displacement pump and includes a swash plate 3a and a servo piston 6. By changing a tilting angle of the swash plate 3a, the hydraulic pump 3 ejects the operating oil at a flow rate corresponding to the tilting angle. Further, the hydraulic pump 3 is a so-called both-tilt (over-center) pump. The swash plate 3a is configured to be tiltable from a neutral position to a first side and a second side in a tilting direction. The swash plate 3a can switch the discharge direction of the hydraulic pump 3 by being tilted from the neutral position to the first side or the second side in the tilting direction. The swash plate 3a configured as above is coupled to the servo piston 6.

The servo piston 6 is configured to be movable toward a first side and a second side in an axial direction thereof, and both end portions of the servo piston 6 are arranged at respective pilot chambers 6a and 6b. Both end portions of the servo piston 6 receive respective pilot pressures of the pilot chambers 6a and 6b. The servo piston 6 moves toward the first side or the second side in the axial direction in accordance with differential pressure between the two pilot pressures. When the position of the servo piston 6 changes, the tilting angle of the swash plate 3a coupled to the servo piston 6 changes, and accordingly, an discharge amount and discharge direction of the hydraulic pump 3 change. To be specific, the discharge amount and discharge direction of the hydraulic pump 3 change in accordance with the differential pressure between the two pilot pressures. The two pilot chambers 6a and 6b configured as above are coupled to the pilot pump 5 through the regulator 4.

The pilot pump 5 is a fixed-displacement pump and is coupled to the above-described driving device in parallel with the hydraulic pump 3. When the pilot pump 5 is rotated by the driving device, the pilot pump 5 ejects pilot oil at a predetermined flow rate. Further, the pilot pump 5 is coupled to the regulator 4, and the ejected pilot oil flows to the regulator 4. The regulator 4 includes a directional control valve 7, and the directional control valve 7 operates in accordance with an operation of an operating lever (not shown). More specifically, the directional control valve 7 is coupled to the pilot pump 5, a tank 9, and the two pilot chambers 6a and 6b. The operating lever is configured to be operable from a neutral position to a first side and a second side in an operating direction. In accordance with the operation of the operating lever, the directional control valve 7 switches a connection status among the pilot pump 5, the tank 9, and the two pilot chambers 6a and 6b and also changes opening degrees of the pilot pump 5, the tank 9, and the two pilot chambers 6a and 6b.

When the HST 2 configured as above rotates the hydraulic motor normally, the operating lever is operated from the neutral position to the first side in the operating direction. With this, the directional control valve 7 connects the pilot pump 5 and the first pilot chamber 6a and also connects the tank 9 and the second pilot chamber 6b. Thus, the pilot oil from the pilot pump 5 is introduced to the first pilot chamber 6a, and the servo piston 6 moves to a first side in a predetermined direction. With this, the swash plate 3a tilts from the neutral position to the first side in the tilting direction, and the operating oil is ejected from the hydraulic pump 3 to the first oil passage 8a. The ejected operating oil is supplied through the first oil passage 8a to one of ports of the hydraulic motor, and the hydraulic motor rotates in a normal direction. Further, the directional control valve 7 supplies the pilot oil to the first pilot chamber 6a at a flow rate corresponding to the operation amount of the operating lever. With this, the swash plate 3a tilts at a tilting angle corresponding to the operation amount of the operating lever, and the hydraulic pump 3 ejects the operating oil of the discharge amount corresponding to the operation amount of the operating lever. Therefore, the hydraulic motor rotates in the normal direction at a speed corresponding to the operation amount of the operating lever.

In contrast, when the HST 2 rotates the hydraulic motor reversely, the operating lever is operated from the neutral position to the second side in the operating direction. With this, the directional control valve 7 connects the pilot pump 5 and the second pilot chamber 6b and also connects the tank 9 and the first pilot chamber 6a. Thus, the pilot oil from the pilot pump 5 is introduced to the second pilot chamber 6b, and the servo piston 6 moves to a second side in the predetermined direction. With this, the swash plate 3a tilts from the neutral position to the second side in the tilting direction, and the operating oil is ejected from the hydraulic pump 3 to the second oil passage 8b. The ejected operating oil is supplied through the second oil passage 8b to the other port of the hydraulic motor, and the hydraulic motor rotates in a reverse direction. Further, the directional control valve 7 supplies the pilot oil to the second pilot chamber 6b at a flow rate corresponding to the operation amount of the operating lever. With this, the swash plate 3a tilts at a tilting angle corresponding to the operation amount of the operating lever, and the hydraulic pump 3 ejects the operating oil of the discharge amount corresponding to the operation amount of the operating lever. Therefore, the hydraulic motor rotates in the reverse direction at a speed corresponding to the operation amount of the operating lever.

Further, when stopping the rotation of the hydraulic motor, the operating lever is returned to the neutral position. With this, the directional control valve 7 connects the two pilot chambers 6a and 6b to the tank 9 and disconnects the two pilot chambers 6a and 6b from the pilot pump 5. Thus, the servo piston 6 is returned to the neutral position, and accordingly, the swash plate 3a is returned to the neutral position. With this, the discharge flow rate of the hydraulic pump 3 decreases, the flow rate of the operating oil flowing to the two oil passages 8a and 8b is suppressed to substantially zero. Further, in order to set the flow rate of the operating oil supplied to the hydraulic motor to zero, the HST 2 includes the valve assembly 1.

Valve Assembly

Figure 2:
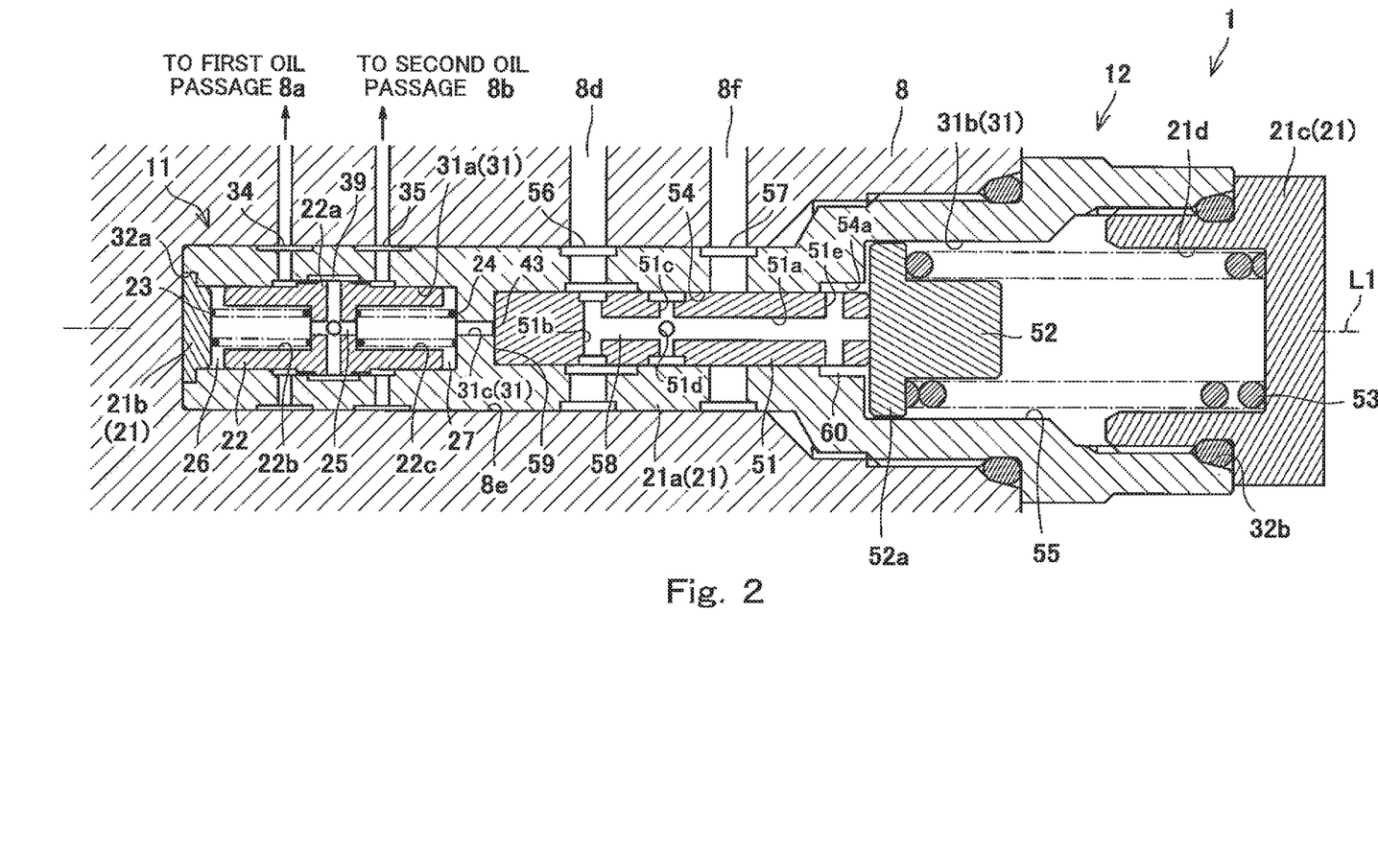
FIG. 2 is a sectional view showing the valve assembly of FIG. 1.

As shown in FIG. 2, the valve assembly 1 is provided at a valve block 8. The valve block 8 includes the above-described two oil passages 8a and 8b and further includes a pilot passage 8c (see FIG. 1), a connecting passage 8d, an insertion hole 8e, and a tank passage 8f. The pilot passage 8c is a passage connecting the two pilot chambers 6a and 6b with the pilot pump 5 through the directional control valve 7. A portion of the pilot passage 8c which portion is located between the directional control valve 7 and the pilot pump 5 is connected to the connecting passage 8d and is connected to the insertion hole 8e through the connecting passage 8d. The insertion hole 8e is a hole to which the valve assembly 1 is attached by being inserted therein. The insertion hole 8e extends along a predetermined axis L1. In addition to the connecting passage 8d, the insertion hole 8e is also connected to the two oil passages 8a and 8b and the tank passage 8f, and the tank passage 8f is connected to the tank 9. As above, the four passages 8a, 8b, 8d, and 8f are connected to the insertion hole 8e, and the valve assembly 1 is inserted in and attached to the insertion hole 8e.

As described above, the valve assembly 1 is configured by assembling the neutral valve 11 and the cutoff valve 12. The valve assembly 1 switches the connection status between the two oil passages 8a and 8b by the neutral valve 11 and switches the connection status between the connecting passage 8d and the tank passage 8f by the cutoff valve 12. Hereinafter, the neutral valve 11 and the cutoff valve 12 will be explained.

Neutral Valve

Figure 3:
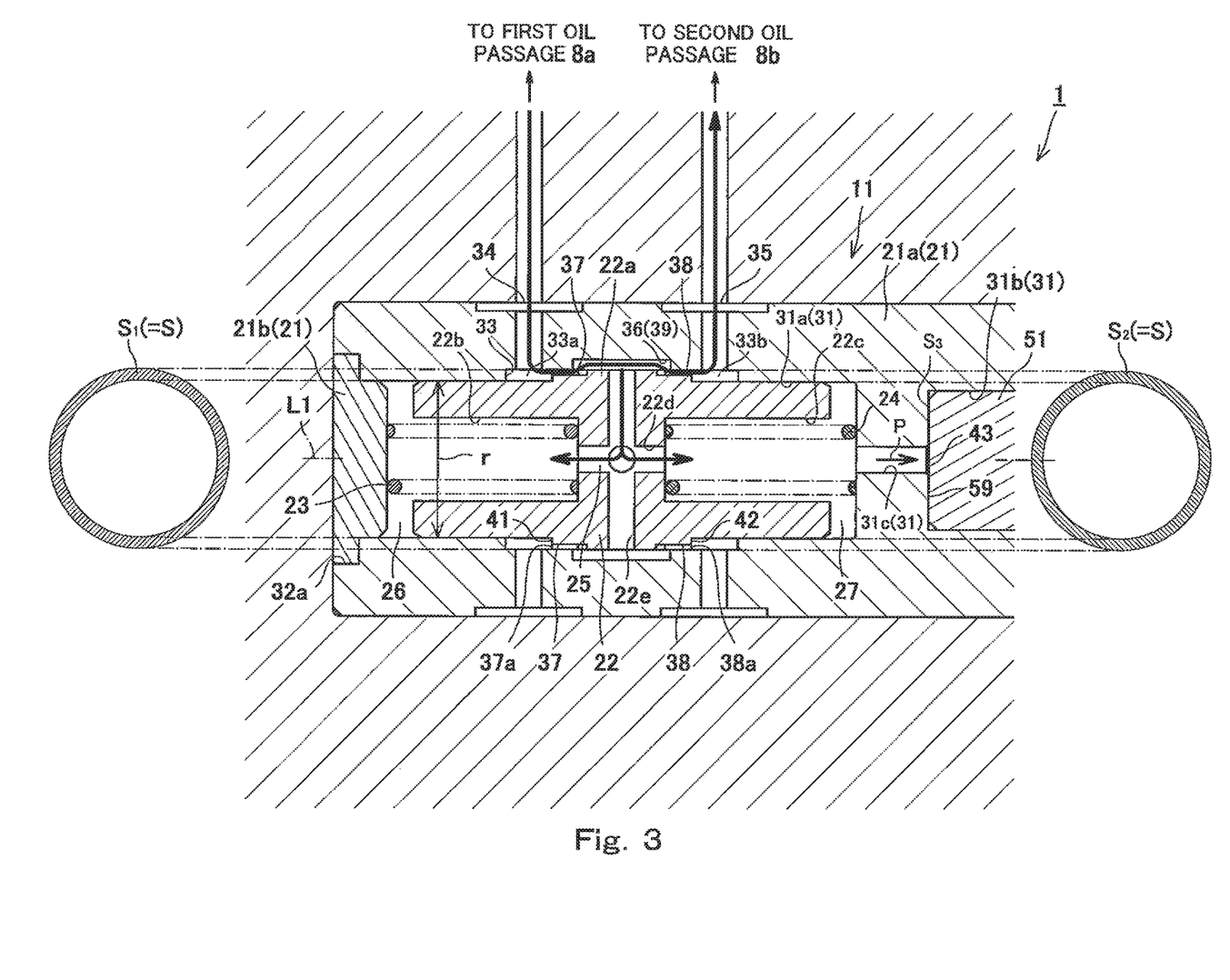
FIG. 3 is an enlarged sectional view showing a neutral valve included in the valve assembly of FIG. 2.

As also shown in FIG. 3, the neutral valve 11 includes a housing 21, a spool 22, and two biasing springs 23 and 24. The housing 21 is formed in a substantially hollow columnar shape and is inserted in and threadedly engaged with the insertion hole 8e of the valve block 8. The housing 21 includes a housing main body 21a, a tip-end lid member 21b, and a base-end lid member 21c. The housing main body 21a is formed in a substantially cylindrical shape and includes an inner hole 31 extending in an axial direction along the axis L1. The inner hole 31 includes two regions 31a and 31b. The first region 31a is located at a tip end side of the housing main body 21a, and the second region 31b is located at a base end side of the housing main body 21a. The inner hole 31 further includes a high-pressure selecting passage 31c between the two regions 31a and 31b. The two regions 31a and 31b are connected to each other by the high-pressure selecting passage 31c. The housing main body 21a formed as above includes an opening 32a at the tip end thereof. The spool 22 is inserted in the housing main body 21a through the opening 32a, and the opening 32a is closed by the tip-end lid member 21b. Thus, the spool 22 is accommodated in the first region 31a so as to be movable in the axial direction.

As shown in FIG. 3, the spool 22 is formed in a substantially cylindrical shape and includes a convex portion 22a at an intermediate portion thereof. The convex portion 22a projects outward in a radial direction beyond the other portion of the spool 22 and is formed at the intermediate portion of the spool 22 over the entire periphery in a circumferential direction of the spool 22. The spool 22 includes an inner hole extending along an axis thereof, and the inner hole includes two spring accommodating chambers 22b and 22c and a communication hole 22d. The spring accommodating chamber 22b is located at a tip end side of the spool 22, and the spring accommodating chamber 22c is located at a base end side of the spool 22. The two spring accommodating chambers 22b and 22c are connected to each other by the communication hole 22d. The spool 22 further includes two through holes 22e between the two spring accommodating chambers 22b and 22c. The two through holes 22e penetrate the spool 22 so as to be perpendicular to the communication hole 22d and also perpendicular to each other. The two through holes 22e are formed in a cross shape in a cross section perpendicular to the axis of the spool 22. Intermediate portions of the two through holes 22e formed as above are connected to the communication hole 22d, and both ends of each of the two through holes 22e are open to an outside of the spool 22.

The spool 22 configured as above is accommodated in the first region 31a, and outer peripheral surfaces of both axial end sides of the spool 22 are in contact with an inner peripheral surface of the housing main body 21a. The spool 22 is formed to be shorter than the first region 31a and is configured to be movable in the first region 31a from a neutral position (see FIGS. 2 and 3) toward a first side (see FIG. 4 described below) and a second side in the axial direction. Further, since the spool 22 is formed to be shorter than the first region 31a, a first pressure chamber 26 is formed in the first region 31a at the second side of the spool 22 in the axial direction, and a second pressure chamber 27 is formed in the first region 31a at the first side of the spool 22 in the axial direction. To be specific, the housing main body 21a includes: the first pressure chamber 26 at which a second axial end of the spool 22 is arranged; and the second pressure chamber 27 at which a first axial end of the spool 22 is arranged. The housing main body 21a further includes a concave portion 33 accommodating the convex portion 22a of the spool 22.

The concave portion 33 is located at an axially intermediate portion of the first region 31a and is formed on the inner peripheral surface of the housing main body 21a over the entire periphery in the circumferential direction. The concave portion 33 is formed to be longer in the axial direction than the convex portion 22a. A diameter of the concave portion 33 is substantially equal to an outer diameter of the convex portion 22a. An outer peripheral surface of the convex portion 22a contacts the inner peripheral surface of the housing main body 21a over the entire periphery in the circumferential direction. With this, the concave portion 33 is divided into a first port-side region 33a and a second port-side region 33b by the convex portion 22a. Each of the first port-side region 33a and the second port-side region 33b is an annular space formed along the outer peripheral surface of the spool 22. The first port-side region 33a is located at a tip end side of the convex portion 22a and is connected to the first oil passage 8a through a first port 34. The second port-side region 33b is located at a base end side of the convex portion 22a and is connected to the second oil passage 8b through a second port 35.

The spool 22 is configured as below in order to isolate the first port-side region 33a from the first pressure chamber 26 and isolate the second port-side region 33b from the second pressure chamber 27. To be specific, each of outer diameters of both axial end portions of the spool 22 is substantially equal to a diameter of the first region 31a, and the outer peripheral surfaces of both axial end portions of the spool 22 are in contact with the inner peripheral surface of the housing main body 21a. With this, a portion between each axial end portion of the spool 22 and the inner peripheral surface of the housing main body 21a is sealed. Thus, the first port-side region 33a is isolated from the first pressure chamber 26, and the second port-side region 33b is isolated from the second pressure chamber 27. In order to make the two regions 33a and 33b, which are isolated as above, communicate with each other, a communication groove 36 is formed on the inner peripheral surface of the housing main body 21a, and a plurality of slits 37 are formed at the spool 22.

The communication groove 36 is located at an axially intermediate portion of the concave portion 33 and is formed on the inner peripheral surface of the housing main body 21a over the entire periphery in the circumferential direction. The communication groove 36 is formed to be shorter in the axial direction than the convex portion 22a. In the present embodiment, even when the spool 22 moves to the first side or the second side in the axial direction, the communication groove 36 is covered with the convex portion 22a at all times. With this, the communication groove 36 is not directly connected to the two regions 33a and 33b. In order to indirectly connect the communication groove 36 with the two regions 33a and 33b, a plurality of slits 37 and 38 (for example, four slits 37 and four slits 38) are formed at the convex portion 22a.

The four slits 37 are formed at a second axial end side of the outer peripheral surface of the convex portion 22a, and the four slits 38 are formed at a first axial end side of the outer peripheral surface of the convex portion 22a. In the present embodiment, the slits 37 are formed at the convex portion 22a at regular intervals (i.e., at about 90° intervals) in the circumferential direction, and the slits 38 are formed at the convex portion 22a at regular intervals (i.e., at about 90° intervals) in the circumferential direction. The slits 37 located at the second axial end side extend from the second axial end of the convex portion 22a toward the second side in the axial direction. The slits 37 include respective openings 37a at the second axial end of the convex portion 22a and are connected to the first port-side region 33a through the openings 37a. The slits 38 located at the first axial end side extend from the first axial end of the convex portion 22a toward the first side in the axial direction. The slits 38 include respective openings 38a at the first axial end of the convex portion 22a and are connected to the second port-side region 33b through the openings 38a.

When the spool 22 is located at the neutral position as shown in FIG. 3, tip end-side portions of the slits 37 and 38 formed as above are connected to the communication groove 36. With this, the two regions 33a and 33b are connected to each other through the slits 37 and 38 and the communication groove 36, and therefore, the two ports 34 and 35 are connected to each other. As above, the communication groove 36 connects the two regions 33a and 33b with each other through the slits 37 and 38 and constitutes a valve passage 39.

Figure 4:
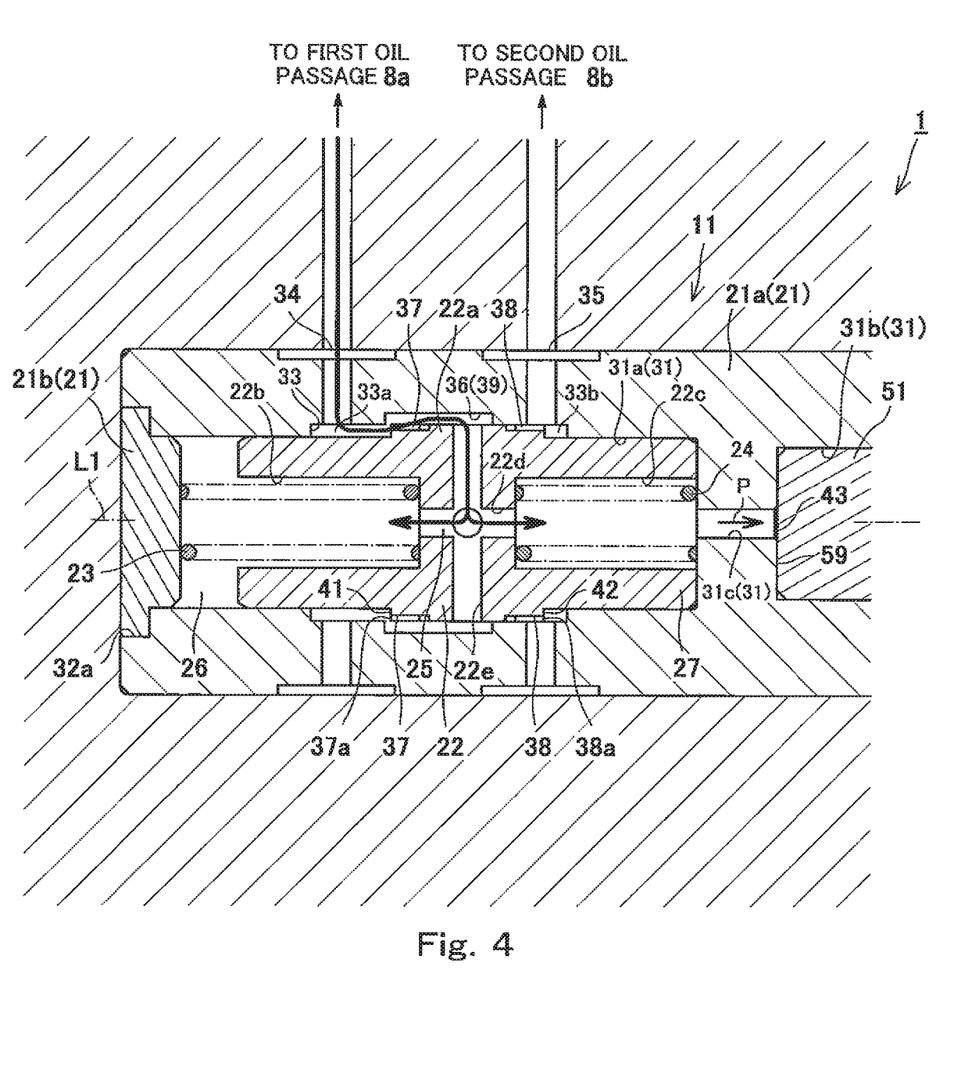
FIG. 4 is an enlarged sectional view showing a state where a spool of the neutral valve of FIG. 3 has moved to a first offset position.

Further, when the spool 22 moves to the first side in the axial direction as shown in FIG. 4, the tip end portions of the slits 38 are covered with the inner peripheral surface of the housing main body 21a. When the spool 22 moves to a first offset position as above, the second port-side region 33b and the valve passage 39 are disconnected from each other, and communication between the first port 34 and the second port 35 is cut off. At this time, the slits 37 are still connected to the valve passage 39, and therefore, the connection between the first port-side region 33a and the valve passage 39 is kept. To be specific, the connection between the first port 34 and the valve passage 39 is kept.

On the other hand, when the spool 22 moves to the second side in the axial direction, the tip end portions of the slits 37 are covered with the inner peripheral surface of the housing main body 21*a*. When the spool 22 moves to a second offset position as above, the first port-side region 33*a* and the valve passage 39 are disconnected from each other, and communication between the second port 35 and the first port 34 is cut off. At this time, the slits 38 are still connected to the valve passage 39, and therefore, the connection between the second port-side region 33*b* and the valve passage 39 is kept. To be specific, the connection between the second port 35 and the valve passage 39 is kept.

Neutral Keeping Function

As above, when the spool 22 is located at the neutral position, the two ports 34 and 35 communicate with each other (see FIG. 3). Further, when the spool 22 moves to the first offset position (see FIG. 4) or the second offset position, the communication between the two ports 34 and 35 is cut off. In order to keep the spool 22 at the neutral position, the first biasing spring 23 and the second biasing spring 24 are accommodated in the two respective spring accommodating chambers 22*b* and 22*c* of the spool 22. The first biasing spring 23 and the second biasing spring 24 are compression coil springs. The first biasing spring 23 biases the spool 22 toward the first side in the axial direction, and the second biasing spring 24 biases the spool 22 toward the second side in the axial direction. As above, the biasing springs 23 and 24 bias the spool 22 against each other. The two biasing springs 23 and 24 are substantially the same in configuration as each other, and biasing forces of the biasing springs 23 and 24 are substantially equal to each other.

Further, in the spool 22, the communication hole 22*d* and the two through holes 22*e* constitute a communication passage 25. The valve passage 39 and the two spring accommodating chambers 22*b* and 22*c* are connected to each other by the communication passage 25. The spring accommodating chamber 22*b* is connected to the first pressure chamber 26, and the spring accommodating chamber 22*c* is connected to the second pressure chamber 27. The operating oil flowing through the valve passage 39 is introduced to the two pressure chambers 26 and 27 through the communication passage 25 and the like. To be specific, the two pressure chambers 26 and 27 communicate with each other through the communication passage 25, and therefore, the hydraulic pressure of the pressure chamber 26 and the hydraulic pressure of the pressure chamber 27 are substantially equal to each other. On this account, the spool 22 is pushed from both sides in the axial direction by the hydraulic pressures that act against each other and are substantially equal in magnitude to each other. Further, a portion of the spool 22 except for the convex portion 22*a* is formed to have a substantially constant outer diameter. Therefore, the spool 22 is pushed by pressing forces in opposing directions along the axial direction, the pressing forces being generated by the hydraulic pressures of the pressure chambers 26 and 27 and being substantially equal to each other. On this account, these two pressing forces acting on the spool 22 cancel out each other.

As shown in FIG. 3, in the spool 22, the second axial end of the convex portion 22*a* constitute a first pressure receiving surface 41, and the first axial end of the convex portion 22*a* constitute a second pressure receiving surface 42. The first pressure receiving surface 41 faces the first port-side region 33*a* (i.e., faces the second side in the axial direction), and the second pressure receiving surface 42 faces the second port-side region 33*b* (i.e., faces the first side in the axial direction). The first pressure receiving surface 41 of the spool 22 receives the hydraulic pressure of the first port-side region 33*a* (i.e., the hydraulic pressure of the first oil passage 8*a*), and the second pressure receiving surface 42 of the spool 22 receives the hydraulic pressure of the second port-side region 33*b* (i.e., the hydraulic pressure of the second oil passage 8*b*). Each of the first pressure receiving surface 41 and the second pressure receiving surface 42 is formed in a substantially annular shape. A pressure receiving area $S_1$ of the first pressure receiving surface 41 and a pressure receiving area $S_2$ of the second pressure receiving surface 42 are substantially equal to each other. The first pressure receiving surface 41 and the second pressure receiving surface 42 receive the respective hydraulic pressures in opposing directions (i.e., toward the first side and the second side in the axial direction, respectively). Therefore, the spool 22 moves to the first side or the second side in the axial direction in accordance with the differential pressure between the above hydraulic pressures.

In the neutral valve 11 configured as above, the spool 22 is positioned such that the biasing forces of the two biasing springs 23 and 24 and the pressing force corresponding to the differential pressure between the two oil passages 8*a* and 8*b* (i.e., differential pressure Δp×pressure receiving area S (=area $S_1$ of first pressure receiving surface, area $S_2$ of second pressure receiving surface)) are balanced. For example, when the differential pressure between the two oil passages 8*a* and 8*b* falls within a predetermined range, the pressing force corresponding to the differential pressure cannot overcome the biasing force, and therefore, the spool 22 is kept at the neutral position. With this, the communication between the two ports 34 and 35 by the valve passage 39 is kept. Further, the operating oil flows from an oil passage having higher hydraulic pressure (in FIG. 3, the first oil passage 8*a*) out of the two oil passages 8*a* and 8*b* through the valve passage 39 to an oil passage having lower hydraulic pressure (in FIG. 3, the second oil passage 8*b*). With this, differential pressure between a supply port and discharge port of the hydraulic motor becomes zero, and therefore, the rotation of the hydraulic motor stops.

In the neutral valve 11 configured to operate as above, a range (i.e., the predetermined range) of the differential pressure by which the spool 22 can be kept at the neutral position is defined in accordance with spring constants of the two biasing springs 23 and 24. To be specific, the differential pressure by which the spool 22 can be held at the neutral position can be adjusted by the spring constants of the two biasing springs 23 and 24. Regarding the spring constants of the two biasing springs 23 and 24, the spool according to prior art receives the hydraulic pressures of the two oil passages 8*a* and 8*b* by both axial sides thereof, and the biasing springs need to act against the pressing forces. On the other hand, according to the neutral valve 11, since the two pressure chambers 26 and 27 communicate with each other, the pressing forces acting on both axial sides of the spool 22 cancel out each other. Further, the convex portion 22*a* is formed at the intermediate portion of the spool 22, and the pressure receiving surfaces 41 and 42 of the convex portion 22*a* receive the respective hydraulic pressures of the two oil passages 8*a* and 8*b* against each other. With this, the spool 22 changes its position in accordance with the biasing forces of the two biasing springs 23 and 24 and the pressing force corresponding to the differential pressure between the two oil passages 8*a* and 8*b* (i.e., differential pressure Δp×pressure receiving area S (=$S_1$, $S_2$)). The pressure receiving area S is smaller than a pressure receiving area (π×(outer diameter r of spool 22×½)$^2$) of each axial side of the spool 22. Therefore, the pressing forces received by the two pressure receiving surfaces 41 and 42 of the spool 22 are smaller than the pressing forces received by both axial sides of the spool of prior art. On this account, according to the neutral valve 11, the spool 22 can be operated by the small pressing forces, and as a result, the spring constants of the biasing springs 23 and 24 can be made low. To be specific, the biasing springs 23 and 24 can be reduced in size, and therefore, the neutral valve 11 can be prevented from increasing in size.

In the neutral valve 11, when the differential pressure between the two oil passages 8*a* and 8*b* does not fall within the predetermined range, the spool 22 moves to the first offset position or the second offset position. For example, when the hydraulic pressure of the first oil passage 8*a* is higher than the hydraulic pressure of the second oil passage 8*b*, the spool 22 moves toward the first side in the axial direction by the pressing force corresponding to the differential pressure between the two oil passages 8*a* and 8*b* to be located at the first offset position (see FIG. 4). With this, the tip end portions of the slits 38 are covered with the inner peripheral surface of the housing main body 21*a*. Thus, the second port 35 and the valve passage 39 are disconnected from each other, and the communication between the first port 34 and the second port 35 is cut off. In contrast, when the hydraulic pressure of the second oil passage 8*b* is higher than the hydraulic pressure of the first oil passage 8*a*, the spool 22 moves toward the second side in the axial direction to be located at the second offset position. With this, the tip end portions of the slits 37 are covered with the inner peripheral surface of the housing main body 21*a*. Thus, the first port 35 and the valve passage 39 are disconnected from each other, and the communication between the second port 35 and the first port 35 is cut off. As above, when the communication between the two ports 34 and 35 is cut off, the differential pressure between the two oil passages 8*a* and 8*b* is kept, and energy loss due to the communication between the two ports 34 and 35 when rotating the hydraulic motor can be suppressed.

As above, in the neutral valve 11, when the differential pressure between the two oil passages 8*a* and 8*b* falls within the predetermined range, the two oil passages 8*a* and 8*b* communicate with each other. In contrast, when the differential pressure between the two oil passages 8*a* and 8*b* does not fall within the predetermined range, the two oil passages 8*a* and 8*b* are disconnected from each other. The neutral valve 11 having such function further has a higher pressure selecting function of outputting higher one of the hydraulic pressures of the two oil passages 8*a* and 8*b*. Hereinafter, this function will be explained in detail.

Higher Pressure Selecting Function

The first region 31*a* is connected to the high-pressure selecting passage 31*c* through a third port 43 and is further connected to the second region 31*b* through the high-pressure selecting passage 31*c*. Further, the third port 43 is connected to the second pressure chamber 27, and the pressure oil of the second pressure chamber 27 is output through the third port 43 to be introduced through the high-pressure selecting passage 31*c* to the second region 31*b* (more specifically, a below-described third pressure chamber 59 of the cutoff valve 12). As described above, when the spool 22 is located at the first offset position or the second offset position, the higher one of the hydraulic pressures of the two oil passages 8*a* and 8*b* is introduced to the second pressure chamber 27 and the first pressure chamber 26. Therefore, the neutral valve 11 outputs the higher one of the hydraulic pressures of the two oil passages 8*a* and 8*b* through the third port 43. To be specific, the neutral valve 11 has the higher pressure selecting function of outputting the higher one of the hydraulic pressures of the two oil passages 8*a* and 8*b* through the third port 43 to the second region 31*b*. Further, a valve element 51 of the cutoff valve 12 described below in detail is inserted in the second region 31*b*.

Cutoff Valve

The cutoff valve 12 that is one example of a discharge valve is a valve configured to operate in accordance with discharge pressure of the oil passage 8*a* or discharge pressure of the oil passage 8*b*. When the cutoff valve 12 operates, the pilot oil flowing from the pilot pump 5 to the regulator 4 is discharged to the tank 9 to restrict an increase in the tilting angle of the swash plate 3*a*. To be specific, when the discharge pressure of the hydraulic pump 3 increases, the cutoff valve 12 restricts the discharge flow rate of the hydraulic pump 3 by decreasing the pilot pressure received by the servo piston 6. As shown in FIG. 2, the cutoff valve 12 having such function shares the housing 21 with the neutral valve 11 and is assembled to the neutral valve 11. In addition to the housing 21, the cutoff valve 12 includes the valve element 51, a spring receiving member 52, and a third biasing spring 53.

The valve element 51 is formed in a substantially bottomed cylindrical shape and is inserted in the second region 31*b* so as to be slidable in the axial direction. More specifically, the second region 31*b* includes a small-diameter portion 54 and a large-diameter portion 55. The small-diameter portion 54 is located at the tip end side (i.e., the second side in the axial direction, in other words, the high-pressure selecting passage 31*c* side) of the large-diameter portion 55. A diameter of the small-diameter portion 54 is substantially equal to an outer diameter of the valve element 51, and the valve element 51 is inserted in the small-diameter portion 54 so as to be slidable. The housing main body 21*a* includes a connection port 56 and a tank port 57. The connection port 56 is connected to the connecting passage 8*d*, and the tank port 57 is connected to the tank passage 8*f*. Further, the two ports 56 and 57 are connected to the small-diameter portion 54, and the connection status between the two ports 56 and 57 is switched in accordance with the position of the valve element 51.

The valve element 51 having such function includes an inner hole 51*a* and three through holes 51*b*, 51*c*, and 51*d*. The inner hole 51*a* extends from a first axial end of the valve element 51 to an intermediate portion of the valve element 51 along an axis of the valve element 51 and is connected to the first through hole 51*b* at the second side in the axial direction. The first through hole 51*b* extends in a radial direction in the valve element 51, and both sides thereof are open on an outer peripheral surface of the valve element 51. The through hole 51*b* formed as above is connected to the connection port 56 to connect the inner hole 51*a* and the connection port 56.

An intermediate portion of the inner hole 51*a* is connected to the two through holes 51*c* and 51*d*. The second through hole 51*c* and the third through hole 51*d* extend in the radial direction in the valve element 51 so as to be perpendicular to the inner hole 51*a* and also perpendicular to each other. Further, both sides of the second through hole 51*c* and both sides of the third through hole 51*d* are open on the outer peripheral surface of the valve element 51. The openings of the second through hole 51*c* and the openings of the third through hole 51*d* are closed by the inner peripheral surface of the housing main body 21*a*. When the valve element 51 moves, the openings of the second through hole 51*c* and the openings of the third through hole 51d are connected to the tank port 57. To be specific, when the valve element 51 is located at a closed position at the second side in the axial direction, the second through hole 51c and the third through hole 51d are closed by the inner peripheral surface of the housing main body 21a (see FIG. 2). In contrast, when the valve element 51 moves to an open position at the first side in the axial direction, the second through hole 51c and the third through hole 51d are connected to the tank port 57.

In the valve element 51 configured as above, the inner hole 51a and the three through holes 51b, 51c, and 51d constitute a discharge oil passage 58. To be specific, the connection status of the discharge oil passage 58 with the tank port 57 switches in accordance with the position of the valve element 51. By this switching of the connection status, the connection status between the connection port 56 and the tank port 57 switches. The position of the valve element 51 configured as above changes in accordance with output pressure output from the above-described third port 43. In the present embodiment, the valve element 51 receives the output pressure by a second axial end thereof to change the position thereof.

More specifically, the small-diameter portion 54 includes a third pressure chamber 59 located at the second side of the valve element 51 in the axial direction. The third pressure chamber 59 is connected to the second pressure chamber 27 through the high-pressure selecting passage 31c and the third port 43. High-pressure oil having the higher pressure selected by the neutral valve 11 is introduced to the third pressure chamber 59. To be specific, the output pressure output from the third port 43 is introduced to the third pressure chamber 59, and the valve element 51 receives the output pressure by the second axial end thereof. Further, the spring receiving member 52 and the third biasing spring 53 are provided at the valve element 51. The third biasing spring 53 biases the valve element 51 through the spring receiving member 52 against the output pressure.

To be specific, the spring receiving member 52 is formed in a substantially cylindrical shape and includes a flange 52a at a second axial end portion thereof. An outer diameter of the flange 52a is larger than the diameter of the small-diameter portion 54. The spring receiving member 52 is arranged at the large-diameter portion 55 that is larger in diameter than the small-diameter portion 54. When the valve element 51 is located at the closed position, a first axial end portion of the valve element 51 slightly projects from the small-diameter portion 54 to the large-diameter portion 55. The spring receiving member 52 is arranged at the large-diameter portion 55 with the second axial end portion thereof contacting the first axial end portion of the valve element 51. The large-diameter portion 55 includes an opening 32b at the first side in the axial direction, and the opening 32b is closed by the base-end lid member 21c. The base-end lid member 21c includes a spring receiving concave portion 21d having a circular cross section about an axis of the base-end lid member 21c, and the third biasing spring 53 is accommodated in the spring receiving concave portion 21d.

The third biasing spring 53 is a so-called compression coil spring, and a first end portion thereof is supported by the base-end lid member 21c. Further, a second end portion of the third biasing spring is externally attached to a portion, projecting from the flange 52a, of the spring receiving member 52 and is supported by the flange 52a. With this, the third biasing spring 53 applies the biasing force to the valve element 51 against the pressing force acting on the valve element 51 to locate the valve element 51 at the closed position. A fourth through hole 51e is formed at the first axial end side of the valve element 51 and is connected to the inner hole 51a. To be specific, the fourth through hole 51e is connected to the connection port 56 through the discharge oil passage 58.

The fourth through hole 51e extends in the radial direction in the valve element 51, and both sides thereof are open on the outer peripheral surface of the valve element 51. The small-diameter portion 54 includes an enlarged diameter portion 54a at a position corresponding to the fourth through hole 51e, i.e., at the first side in the axial direction. The enlarged diameter portion 54a is larger in diameter than the other portion of the small-diameter portion 54. A space 60 having a substantially annular shape is formed around the first axial end side of the valve element 51 by the enlarged diameter portion 54a. The fourth through hole 51e is connected to the large-diameter portion 55 through the space 60, and the large-diameter portion 55 is filled with the operating oil. Since the operating oil can flow back and forth between the large-diameter portion 55 and the connection port 56, the valve element 51 is allowed to move to the first side and the second side in the axial direction.

Cutoff Function

As described above, according to the cutoff valve 12 configured as above, the second axial end of the valve element 51 receives the output pressure output from the third port 43, and the valve element 51 moves in accordance with the magnitude of the output pressure. More specifically, the valve element 51 moves to a position where forces, such as the pressing force corresponding to the output pressure (i.e., output pressure P×area of second axial end of valve element 51) and the biasing force of the third biasing spring 53, acting on the valve element 51 are balanced. For example, when the discharge pressure of the hydraulic pump 3 is low pressure (i.e., not more than limit pressure), and the output pressure is less than predetermined pressure corresponding to the limit pressure, the valve element 51 is located at the closed position shown in FIG. 2. At this time, the discharge oil passage 58 and the tank port 57 are disconnected from each other. To be specific, the connection port 56 and the tank port 57 are disconnected from each other, and the operating oil of the discharge amount corresponding to the operation amount of the operating lever is ejected from the hydraulic pump 3. With this, the hydraulic motor can be rotated at a speed corresponding to the operation amount of the operating lever.

Figure 5:
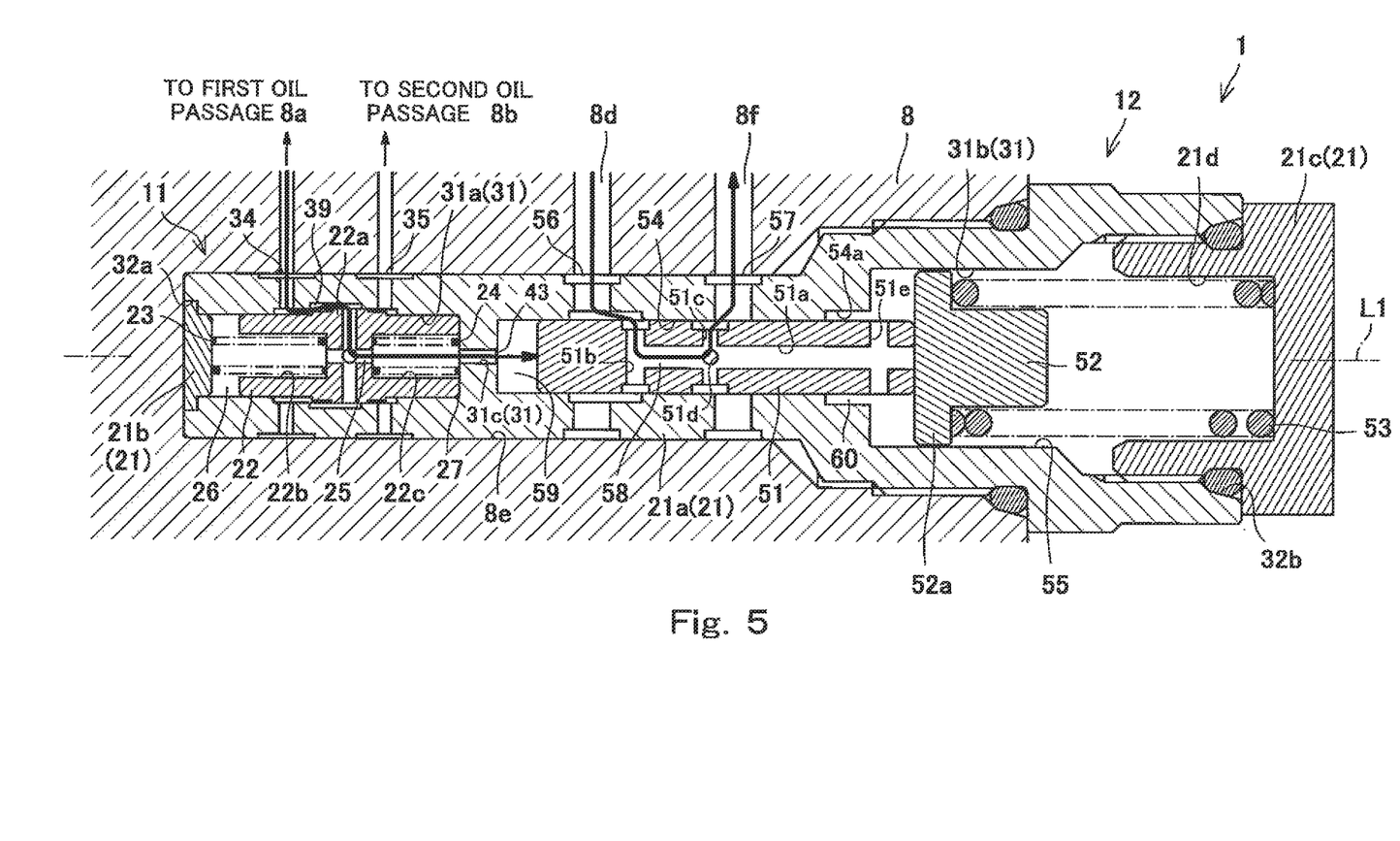
FIG. 5 is a sectional view showing a state where a cutoff valve included in the valve assembly of FIG. 2 connects a discharge oil passage and a tank.

In contrast, when the discharge pressure of the hydraulic pump 3 is high pressure (i.e., not less than the limit pressure), and the output pressure is not less than the predetermined pressure, the valve element 51 moves from the closed position to the open position shown in FIG. 5. At this time, the discharge oil passage 58 and the tank port 57 are connected to each other. To be specific, the connection port 56 and the tank port 57 communicate with each other, and the pilot oil flowing through the pilot passage 8c is discharged to the tank 9 through the connecting passage 8d and the tank passage 8f. Therefore, the increase in the tilting angle of the swash plate 3a is restricted, and the discharge pressure of the hydraulic pump 3 is restricted to the limit pressure. After that, even if the operation amount of the operating lever is increased, the tilting angle of the swash plate 3a is kept, and the discharge pressure of the hydraulic pump 3 is restricted to not more than the limit pressure.

More specifically, an opening degree between the discharge oil passage 58 and the tank port 57 changes in accordance with the position of the valve element 51. To be specific, the amount of oil discharged to the tank 9 changes in accordance with the output pressure. Therefore, if the operation amount of the operating lever is increased for increasing the discharge pressure of the hydraulic pump 3, the amount of oil discharged to the tank 9 increases. With this, the tilting angle of the swash plate 3a decreases, and the discharge pressure of the hydraulic pump 3 is kept at the limit pressure. Thus, the discharge pressure of the hydraulic pump 3 is limited, and torque of the hydraulic motor is limited. Next, when the operating lever is returned to the neutral position in order to reduce the torque, the tilting angle of the swash plate 3a starts decreasing, and the discharge pressure of the hydraulic pump 3 becomes not more than the limit pressure. Then, the output pressure also becomes not more than the predetermined pressure. Thus, the valve element 51 moves from the open position to the closed position, and the connection port 56 and the tank port 57 are disconnected from each other. With this, the hydraulic motor can be rotated at a speed corresponding to the operation amount of the operating lever. In the present embodiment, the reference sign 8d denotes the connecting passage, the reference sign 8f denotes the tank passage, the reference sign 56 denotes the connection port, and the reference sign 57 denotes the tank port. However, the reference sign 8d may denote the tank passage, the reference sign 8f may denote the connecting passage, the reference sign 56 may denote the tank port, and the reference sign 57 may denote the connection port.

Other Operational Advantages of Valve Assembly

In the neutral valve 11 of the valve assembly 1 configured as above, the convex portion 22a is formed at the intermediate portion of the spool 22, and the pressure receiving surfaces 41 and 42 of the convex portion 22a receive the hydraulic pressures of the oil passages 8a and 8b. Therefore, by adjusting a projection amount of the convex portion 22a with respect to the other portion of the spool 22, i.e., by adjusting an outer size of the convex portion 22a, the pressure receiving areas $S_1$ and $S_2$ of the two pressure receiving surfaces 41 and 42 can be adjusted. For example, when the pressure receiving areas $S_1$ and $S_2$ of the two pressure receiving surfaces 41 and 42 are reduced by reducing the projection amount of the convex portion 22a, i.e., by reducing the outer size of the convex portion 22a, the pressing force acting on the spool 22 can be suppressed. Thus, the neutral valve 11 can be further reduced in size.

In the valve assembly 1, the neutral valve 11 has the higher pressure selecting function, and therefore, a high pressure selection valve can be omitted. With this, the cutoff valve 12 can be assembled to the neutral valve 11. By assembling the cutoff valve 12 to the neutral valve 11, the high-pressure selecting passage 31c can be shortened, and therefore, the valve assembly 1 can be made compact. Further, the cutoff valve 12 is assembled to the neutral valve 11 such that the neutral valve 11 and the cutoff valve 12 share the housing 21 as in the present embodiment. With this, the number of parts can be reduced.

Other Embodiments

The present embodiment has explained an example in which the hydraulic closed circuit including the valve assembly 1 is the HST 2. However, the hydraulic closed circuit including the valve assembly 1 is not limited to the HST 2. However, a different hydraulic closed circuit (such as a hydraulic closed circuit capable of performing output through both ports thereof and constituted by a pump and a cylinder) may be used. Further, the present embodiment has explained the valve assembly 1 configured by assembling the cutoff valve 12 to the neutral valve 11. However, the neutral valve 11 and the cutoff valve 12 may be constituted separately. In this case, the neutral valve 11 and the cutoff valve 12 are configured as below, for example. To be specific, the spool 22 and the valve element 51 are individually inserted in two different insertion holes formed on the valve block 8, and the second pressure chamber 27 and the third pressure chamber 59 are connected to each other by the high-pressure selecting passage formed on the valve block 8. With this, the same functions as the above-described valve assembly 1 can be achieved.

Further, the neutral valve 11 and the cutoff valve 12 do not necessarily have to be used in combination, and the neutral valve 11 may be used alone. When the neutral valve 11 is used alone, for example, the neutral valve 11 may have only the neutral keeping function without forming the high-pressure selecting passage 31c at the housing 21. Further, in the neutral valve 11 of the present embodiment, the high-pressure selecting passage 31c is connected to the second pressure chamber 27. However, the third port 43 may be formed at the first pressure chamber 26, and the high-pressure selecting passage 31c may be connected to the first pressure chamber 26. Further, the cutoff valve 12 assembled to the neutral valve 11 is not limited to the above-described configuration. In the cutoff valve 12, the valve element 51 directly receives the output pressure. However, the valve element 51 may indirectly receive the output pressure through a rod or the like. Further, the operating oil is used in the closed circuit. However, the present embodiment is not limited to the operating oil, and other fluids, such as air, may be used.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1 valve assembly
8a first oil passage (fluid passage)
8b second oil passage (fluid passage)
11 neutral valve
12 cutoff valve (discharge valve)
21 housing
22 spool
22a convex portion
23 first biasing spring
24 second biasing spring
25 communication passage
26 first pressure chamber
27 second pressure chamber
34 first port
35 second port
39 valve passage
41 first pressure receiving surface
42 second pressure receiving surface
43 third port
51 valve element
53 third biasing spring
59 third pressure chamber

The invention claimed is:

1. A neutral valve comprising: a housing including a first port and a second port, the housing including a bore:

a spool inserted through the bore of the housing so as to be movable in a predetermined direction, the spool being configured to move to a neutral position set such that the first port and the second port are connected to each other through a valve passage, a first offset position located at a first side of the neutral position in the predetermined direction and set such that the second port and the valve passage are disconnected from each other, and a second offset position located at a second side of the neutral position in the predetermined direction and set such that the first port and the valve passage are disconnected from each other; and first and second biasing members configured to bias the spool toward the first side and the second side in the predetermined direction, respectively, against each other to locate the spool at the neutral position, wherein:

an outer peripheral portion of the spool that is in sliding contact with the bore and that includes a first pressure receiving surface extended radially outward from the outer peripheral portion configured to receive fluid pressure of the first port to be pushed toward the first side in the predetermined direction and a second pressure receiving surface extended radially outward from the outer peripheral portion configured to receive the fluid pressure of the second port to be pushed toward the second side in the predetermined direction;

the housing includes a first pressure chamber and a second pressure chamber which are isolated from the first port and the second port, both predetermined-direction end portions of the spool being arranged at the respective first and second pressure chambers; and the first pressure chamber and the second pressure chamber are connected to the valve passage through a communication passage.

2. The neutral valve according to claim 1, wherein:

the spool includes a convex portion formed at an intermediate portion of an outer peripheral surface of the spool over an entire periphery in a circumferential direction;

the first pressure receiving surface faces the second side of the convex portion in the predetermined direction; and the second pressure receiving surface faces the first side of the convex portion in the predetermined direction.

3. The neutral valve according to claim 1, wherein the housing includes a third port connected to at least one of the first pressure chamber and the second pressure chamber.

4. A valve assembly comprising:

the neutral valve according to claim 3; and a discharge valve capable of discharging a fluid flowing through a fluid passage and configured to adjust a discharge amount of the fluid based on output pressure output from the third port, wherein the discharge valve is assembled to the housing of the neutral valve.

5. The valve assembly according to claim 4, wherein the discharge valve includes:

a valve element configured to receive the output pressure and change the discharge amount of the fluid in accordance with the output pressure; and a discharge-side biasing member configured to bias the valve element against the output pressure.

6. A valve assembly comprising:

a neutral valve comprising:

a housing including a first port and a second port;

a spool inserted in the housing so as to be movable in a predetermined direction, the spool being configured to move to a neutral position set such that the first port and the second port are connected to each other through a valve passage, a first offset position located at a first side of the neutral position in the predetermined direction and set such that the second port and the valve passage are disconnected from each other, and a second offset position located at a second side of the neutral position in the predetermined direction and set such that the first port and the valve passage are disconnected from each other; and first and second biasing members configured to bias the spool toward the first side and the second side in the predetermined direction, respectively, against each other to locate the spool at the neutral position, wherein:

an outer peripheral portion of the spool includes a first pressure receiving surface configured to receive fluid pressure of the first port to be pushed toward the first side in the predetermined direction and a second pressure receiving surface configured to receive the fluid pressure of the second port to be pushed toward the second side in the predetermined direction, the housing includes a first pressure chamber and a second pressure chamber which are isolated from the first port and the second port, both predetermined-direction end portions of the spool being arranged at the respective first and second pressure chambers;

the first pressure chamber and the second pressure chamber are connected to the valve passage through a communication passage, the housing includes a third port connected to at least one of the first pressure chamber and the second pressure chamber; and a discharge valve capable of discharging a fluid flowing through a fluid passage and configured to adjust a discharge amount of the fluid based on output pressure output from the third port, wherein the discharge valve is assembled to the housing of the neutral valve.

7. The valve assembly according to claim 6, wherein the discharge valve includes:

a valve element configured to receive the output pressure and change the discharge amount of the fluid in accordance with the output pressure; and a discharge-side biasing member configured to bias the valve element against the output pressure.

8. The neutral valve according to claim 1, wherein a communication groove is formed on an inner peripheral surface of the bore, and each of outer diameters of axial end portions of the spool are in sliding contact with the inner peripheral surface of the bore.

* * * * *